Figure 1:
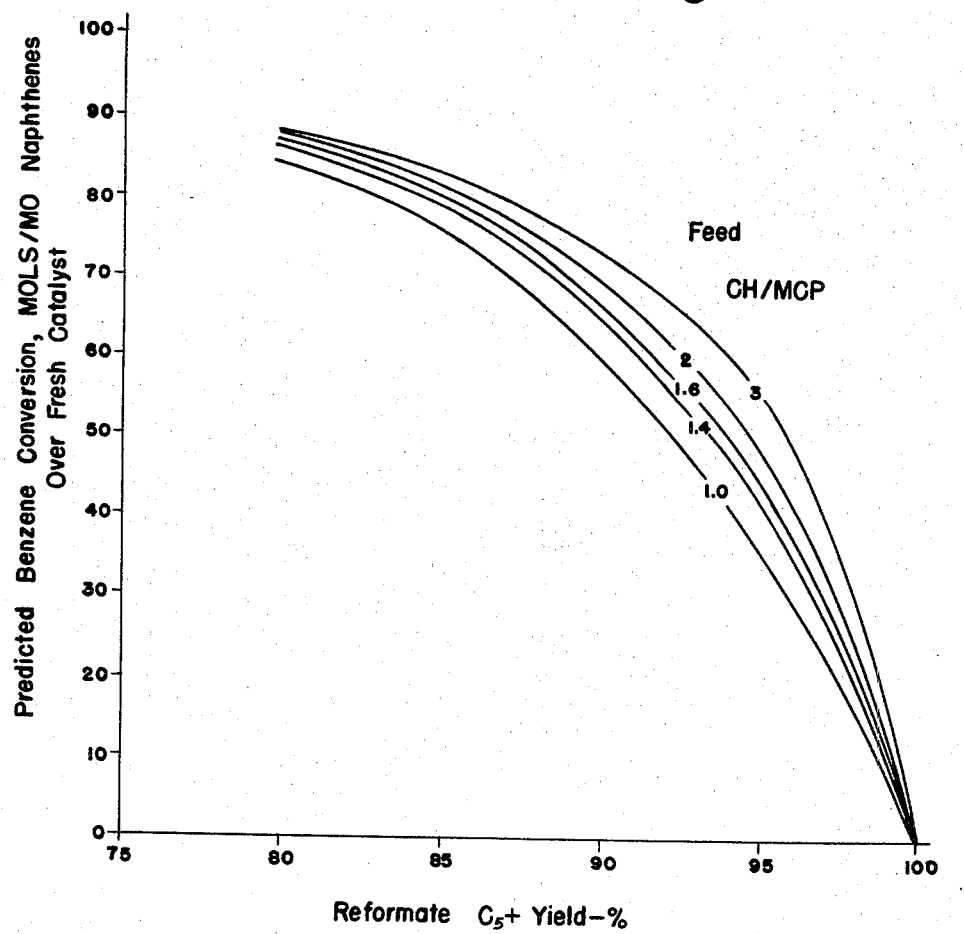

July 5, 1960  J. A. GUTHRIE  2,944,090
PRODUCTION OF BENZENE
Filed Jan. 23, 1959  2 Sheets-Sheet 1

INVENTOR.
JACK A. GUTHRIE
BY Robert O. Spindle
ATTORNEY

July 5, 1960     J. A. GUTHRIE     2,944,090
PRODUCTION OF BENZENE
Filed Jan. 23, 1959     2 Sheets-Sheet 2

INVENTOR.
JACK A. GUTHRIE
BY Robt O. Spindle
ATTORNEY

United States Patent Office 2,944,090
Patented July 5, 1960

2,944,090

PRODUCTION OF BENZENE

Jack A. Guthrie, Media, Pa., assignor to Sun Oil Company, Philadelphia, Pa., a corporation of New Jersey Filed Jan. 23, 1959, Ser. No. 788,678

2 Claims. (Cl. 260—668)

This invention relates to the production of aromatics by the dehydrogenation of naphthenes, and relates more particularly to a method for increasing the quantity of benzene which may be produced from $C_6$ naphthenes when using as a catalyst platinum supported on a halogen-containing alumina.

This application is a continuation-in-part of my copending application Serial No. 739,761, filed June 4, 1958, and now abandoned.

Commercial processes for the production of aromatics such as benzene and toluene by dehydrogenation of the naphthenes present in the low-boiling fractions of straight-run petroleum naphthas, with concomitant isomerization and hydrocracking of the acyclic components of the feed to a higher octane gasoline fraction, is well known to the art. In such processes the feed stock is contacted with a catalyst in the presence of added hydrogen, at temperatures of from about 875° F. to 975° F., at a pressure of from about 200 p.s.i.g. to about 600 p.s.i.g. A preferred catalyst is formed by impregnating an alumina base containing from about 0.5% to about 6% of combined halogen with a soluble platinum compound, and then calcining the catalyst to convert the platinum compound to platinum metal. The finished catalyst should contain from about 0.1% to about 1% platinum. Such catalysts possess dehydrogenating, isomerization and hydrocracking activity, and these activities are so balanced in the manufacture of the catalyst as to insure that there is a maximum of dehydrogenation and isomerization activity, but only sufficient hydrocracking activity to crack such straight chain, low octane, paraffins as are not isomerized to higher octane branched chain paraffins.

Reactions involved in the production of benzene involve dehydrogenation of cyclohexane and isomerization of methyl cyclopentane to cyclohexane, followed by dehydrogenation. In the production of toluene the reactions are dehydrogenation of methyl cyclohexane, isomerization of dimethyl cyclopentane to methyl cyclohexane, followed by dehydrogenation and dehydrogenation and dehydrocyclization of heptane. If the isomerization and dehydrogenation functions of the catalyst are properly balanced the rate of isomerization and dehydrogenation reactions is sufficiently rapid to convert substantially all of the naphthenes in the feed to the corresponding aromatics. After the process is on stream for some time, however, the catalyst appears to lose its ability to isomerize methyl cyclopentane, and considerable quantities of this material pass through the process unchanged, resulting in a progressive drop in benzene production. Strangely, the catalyst does not appear to lose its ability to isomerize dimethyl cyclopentane, since the production of toluene remains fairly constant. The rate of isomerization of methyl cyclopentane may be increased by increasing the temperature, but with temperature increase the rate of hydrocracking of paraffins increases rapidly, resulting in a lowering of the yield of total liquid product. In addition, some of the cyclopentanes are hydrocracked, resulting in a lower yield of the desired aromatics. The same deleterious effects are experienced if the isomerization activity of the fresh catalyst is not strong enough to rapidly isomerize methylcyclopentane, which is apparently much less easily isomerized than the dimethyl cyclopentanes.

It is an object of this invention to provide a method for increasing the quantity of benzene which may be produced from a given feed stock comprising methyl cyclopentane without significantly decreasing the total liquid yield.

I have discovered that the foregoing object may be achieved by incorporating in the feed stock, after the isomerization activity of the catalyst has declined somewhat, or if the isomerization activity of the fresh catalyst is somewhat deficient, from 3 to 12 parts per million, based on the hydrocarbons charged, of ammonia or a substance yielding ammonia in an equivalent amount under the reaction conditions, such as an amine. It has been found that by so doing the benzene production may be substantially increased when operating under conditions which give the same total yield of $C_5+$ product as when operating without ammonia addition. Two parts per million or less appear to be ineffective. More than twelve parts per million appear to poison the catalyst, since the beneficial effect of ammonia appears to peak at about 5 parts per million, and with increasing amounts of ammonia, catalyst activity for benzene production appears to drop off, until at 12 parts per million only a slight increase in activity is observed over that obtained when no ammonia is included in the feed. Apparently the ammonia acts to suppress hydrocracking without suppressing the isomerization function of the feed, which would appear to be rather surprising, since those skilled in the art have in the past believed that isomerization and hydrocracking take place on the same acidic halide sites of the catalyst, and that if the halide were to be neutralized, both isomerization and hydrocracking would be adversely affected. (See, for example, "Industrial and Engineering Chemistry" 47, page 729.) Another surprising feature of the present invention is that while the yield of benzene is substantially increased, addition of ammonia apparently has no effect whatever on the yield of toluene, when processing a feed stock containing both $C_6$ and $C_7$ naphthenes.

The amount of $C_6$ naphthenes which are converted to benzene when operating with a fresh catalyst is a function of the ratio of cyclohexane to methyl cyclopentane in the feed, and of the severity of operating conditions as reflected in the yield of $C_5+$ liquid product. In order to be able to measure declines in catalytic activity during commercial operations a large number of pilot plant runs were made with varying cyclohexane/methyl cyclopentane ratios, and at varying operational severities. From these data a set of curves was drawn up indicating what yields of benzene could be expected with fresh catalyst at varying ratios and $C_5+$ yields. These curves are shown in Fig. 1 of the accompanying drawing. In measuring the extent of decline of catalyst activity it is only necessary to plot the conversion of $C_6$ naphthenes at any time during the run, and determine from the curves the extent of catalyst deterioration. For example, if it is determined that at a particular time the ratio of cyclohexane to methyl cyclopentane is unity, the yield of $C_5+$ product is 83% of the feed, and the conversion of $C_6$ naphthenes to benzene is 60%; the activity of the catalyst for $C_6$ naphthene conversion has declined by 25%, since with fresh catalyst a conversion of 80% would be expected.

As a specific example of the results which may be obtained by proceeding according to the present invention the data in the following table are presented.

life of 61 barrels per pound, rose to a value only 17 mol percent under the predicted conversion for fresh catalyst.

*Table I*

|  |  |  |  |  |  |  |  |  |  |
|---|---|---|---|---|---|---|---|---|---|
| Catalyst Age (bbl./lb.) | 45.9 | 50.3 | 50.6 | 50.9 | 51.8 | 59.1 | 61 | 65.4 | 67 |
| Percent $C_6$ Naphthenes in feed | 11.5 | 13.0 | 12.5 | 13.5 | 14.5 | 12.0 | 12.5 | 12.5 | 12.0 |
| Ratio Cyclohexane/Methyl Cyclopentane | 1.3 | 1.6 | 1.3 | 1.25 | 1.2 | 1.4 | 1.1 | 1.3 | 1.18 |
| Ammonia, p.p.m. | 0 | 0 | 4 | 4 | 2 | 2 | 3 | 4 | 0 |
| Inlet Temperature, °F.: |  |  |  |  |  |  |  |  |  |
| Reactor 1 | 915 | 920 | 920 | 929 | 931 | 933 | 934 | 944 | 922 |
| Reactor 2 | 912 | 925 | 920 |  |  | 931 | 939 | 946 | 925 |
| Reactor 3 | 917 | 908 | 921 | 930 | 931 | 936 | 940 | 944 | 928 |
| Reactor 4 | 912 | 921 | 915 | 930 | 930 | 934 | 938 | 946 | 922 |
| LHSV | 3.11 | 3.13 | 3.16 | 3.09 | 3.08 | 3.12 | 3.15 | 3.12 | 3.10 |
| $H_2$/Feed mol ratio |  | 3.33 | 3.27 | 3.27 | 3.36 | 3.37 | 3.23 | 3.96 | 3.78 |
| Reactor 1 outlet pressure (p.s.i.g.) | 420 | 400 | 390 | 380 | 400 | 410 | 395 | 430 | 425 |
| $C_5$+ yield, percent of charge | 83.4 | 84.2 | 84.4 | 82.8 | 82.0 | 81.7 | 86.5 | 87.8 | 86.4 |
| Benzene conversion | 59 | 47 | 72 | 69 | 54 | 53 | 56 | 54 | 42 |
| Predicted conversion for fresh catalyst | 81 | 81 | 79 | 81 | 83 | 84 | 73 | 67 | 74 |
| Actual vs. Predicted Conversion | −22 | −34 | −7 | −12 | −29 | −31 | −17 | −13 | −32 |
| Methyl Cyclopentane: |  |  |  |  |  |  |  |  |  |
| Percent in charge | 5.0 | 5.0 | 5.5 | 6.0 | 6.5 | 5.0 | 6.0 | 5.5 | 5.5 |
| Percent in product | 2.5 | 3.0 | 2.0 | 2.5 | 3.0 | 4.0 | 4.5 | 4.5 | 5.0 |

The term LHSV in the foregoing table refers to liquid hourly space velocity, that is, volumes of liquid feed per volume of catalyst per hour. Bbl./lb. refers to the number of barrels of feed which has been passed through the reactor per pound of catalyst. P.s.i.g. is pounds per square inch gauge. These data were gathered in the course of a commercial run charging about 600 barrels per hour of a $C_6$–$C_7$ straight run petroleum fraction, and cover an operating period of about two and one-half months. The catalyst used in this run was the same catalyst as used in the pilot plant runs, and the benzene yield at the beginning of the run was essentially that which would be predicted from Fig. 1. This catalyst, which will be referred to as catalyst A, contained 0.6% by weight platinum, 0.41% by weight chloride, and 0.005% fluoride, the balance being alumina. The hydrocarbon feed stock was a straight run petroleum fraction boiling from about 100° F. to about 220° F. However, the same results may be obtained with any saturated hydrocarbon fraction comprising $C_6$ naphthenes, such as a hydrogenated cracked fraction boiling in about the same range. The catalyst inventory was divided among four pairs of reactors, and the effluent from each of the first three pairs of reactors was reheated to operating temperatures prior to passage to the next pair of reactors to compensate for heat losses due to endothermic dehydrogenation reactions.

The data in the first column of the table were taken when 45.9 barrels of feed per pound of catalyst had been passed through the reactors. As may be observed from line 13, the mol percent conversion of $C_6$ naphthenes to benzene was 59%. Referring to the drawing, at a cyclohexane/methyl cyclopentane ratio of 1.3 (line 3 of the table) and at a yield of $C_5$+ product of 84.4% (line 12 of the table) the expected conversion with fresh catalyst would be 81%. The ability of the catalyst to convert $C_6$ naphthenes to benzene had thus deteriorated by 22 mol percent conversion. Two weeks later, when the catalyst age had reached 50.3 barrels per pound, conversion of $C_6$ naphthenes was down to 57 mol percent, 34 mol percent under that which would have been obtained with fresh catalyst. Four parts per million of ammonia were then added to the feed, and the naphthene conversion to benzene jumped to 72%, only 7% under that which would be expected with fresh catalyst. The next day, at a catalyst life of 50.9 barrels per pound, $C_6$ naphthene conversion was only 12% under that which would be expected with fresh catalyst. The amount of ammonia in the feed was then reduced to 2 parts per million, under which conditions the conversion was about 30 mol percent less than that which would be obtained with fresh catalyst, indicating that 2 parts per million does no good. After about a month of operation at 2 parts per million of ammonia, the ammonia content of the feed was raised to 3 parts per million, and the conversion, at a catalyst life of 61 barrels per pound, rose to a value only 17 mol percent under the predicted conversion for fresh catalyst.

The ammonia content was then raised to 4 parts per million, and conversion rose to only 13 mol percent under the predicted value. Addition of ammonia was then stopped, and conversion immediately dropped to 32 mol percent under the predicted value. While the conversion of $C_7$ naphthenes to toluene is not shown in the foregoing table, the conversion remained essentially constant during the entire period of the run.

The foregoing run demonstrates the beneficial results of the addition of 3 and 4 parts per million of ammonia to the feed. After the activity of the catalyst had declined to a point at which further processing would be uneconomic, the run was stopped, catalyst A was unloaded from the catalyst cases, and they were reloaded with catalyst B, obtained from the same manufacturer. Reforming of the same feed as used in the preceding run was then commenced over catalyst B. While this batch of catalyst appeared to have about the same physical and chemical characteristics as catalyst A, its initial activity for the production of benzene was much lower than that of catalyst A, as evidenced by the fact that when only 1.1 barrel of feed per pound of catalyst had been processed, production of benzene was 12 mol percent lower than would be predicted from Fig. 1. Addition of ammonia to the feed was therefore commenced when less than 4 barrels of feed per pound of catalyst had been processed. In order to determine the effect of different concentrations of ammonia on the performance of the catalyst, the amount added to the feed was varied from time to time. Data obtained from this run are set forth in the following table:

*Table II*

|  |  |  |  |  |  |
|---|---|---|---|---|---|
| Catalyst Age (bbl./lb.) | 1.7 | 4.2 | 9.0 | 11.0 | 12.1 |
| Ammonia, p.p.m. | 0 | 3 | 8.5 | 6.5 | 12 |
| Inlet Temperature, °F.: |  |  |  |  |  |
| Reactor 1 | 921 | 934 | 949 | 950 | 950 |
| Reactor 2 | 927 | 936 | 950 | 950 | 951 |
| Reactor 3 | 927 | 938 | 949 | 957 | 949 |
| Reactor 4 | 929 | 936 | 949 | 953 | 950 |
| LHSV | 3.27 | 3.41 | 3.6 | 3.8 | 3.31 |
| $H_2$/Feed mol ratio | 3.1 | 2.82 | 2.9 | 2.9 | 3.3 |
| Reactor 1 outlet Pressure (p.s.i.g.) | 480 | 460 | 500 | 490 | 485 |
| $C_5$+ yield (percent of charge) | 87.8 | 90.5 | 89.5 | 89.3 | 89.2 |
| Benzene Conversion | 58 | 65 | 64 | 67 | 61 |
| Actual vs. Predicted Conversion | −16 | +3 | −3 | +1 | −7 |
| Toluene Conversion | 93 | 83 | 86 | 81 | 86 |
| Actual vs. Predicted Conversion | −1 | −1 | −3 | −7 | −5 |

Figure 2:
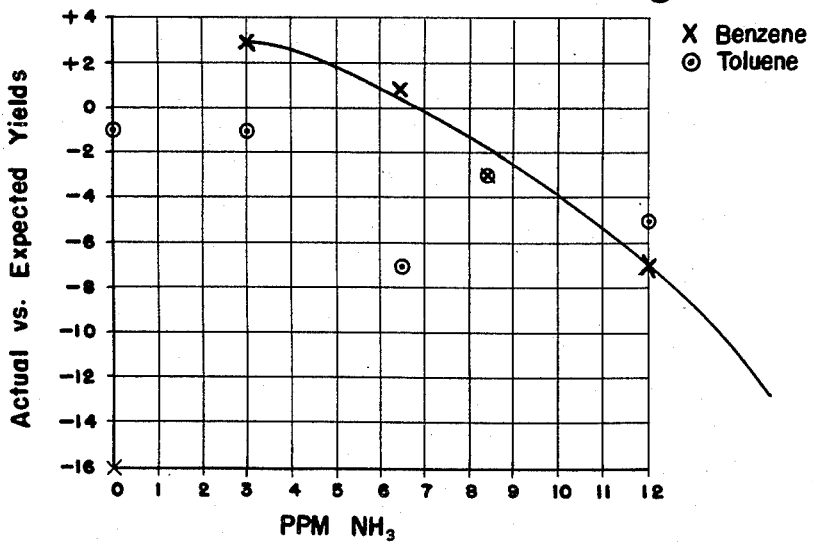
Figure 3:
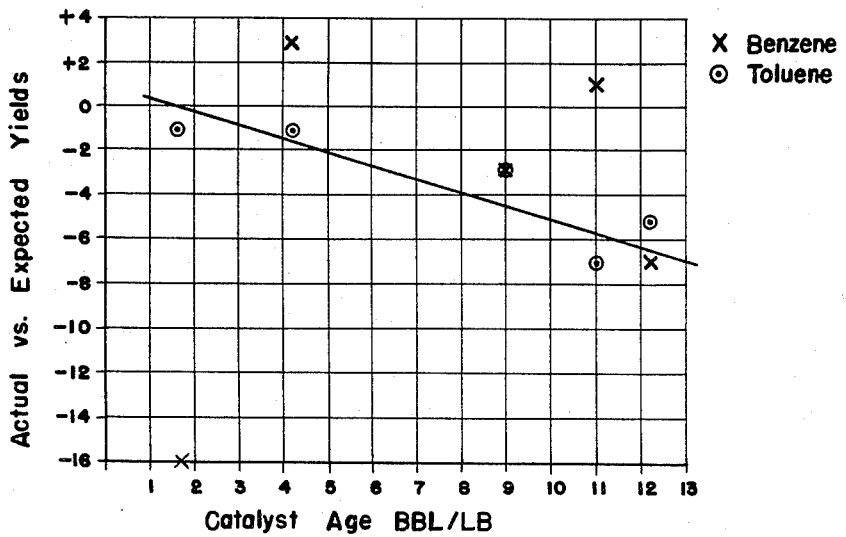

Table II gives the data from which Figs. 2 and 3 of the drawings were constructed. Fig. 2 is a graph showing the actual vs. expected conversions of feed naphthenes to benzene and toluene at various concentrations of ammonia in the feed, while Fig. 3 shows the actual vs. expected conversion of feed naphthenes to benzene and toluene at various catalyst ages. The expected conversion of naphthenes to toluene was determined from a graph based on data from the same pilot plant runs from which the data necessary to construct Fig. 1 was obtained, indicating the expected conversion with fresh catalyst at various $C_5+$ yields and at various dimethyl cyclopentane/methylcyclohexane ratios in the feed.

It will be noted from Fig. 2 that if no ammonia is present in the feed the actual benzene conversion is very low as compared to the expected conversion. However, when from 3 to 6.5 parts per million of ammonia are present in the feed, the conversion is higher than would be expected with fresh catalyst, indicating that ammonia is beneficial even with fairly fresh catalyst, and that for optimum conversions over the life of the catalyst the ammonia should be included from the start of each run. This figure also illustrates that good results are obtained with 8.5 parts per million of ammonia, and, while the beneficial effect of the ammonia apparently drops off as the amount is increased, even with 12 parts per million of ammonia, the conversion is better than would be the case if no ammonia were present in the feed. It should be noted that ammonia apparently has no effect on the yield of toluene, since the datum points are widely scattered.

Fig. 3 illustrates the effect of catalyst age on the actual vs. expected yields of benzene and toluene. It will be noted that the presence of ammonia, and not catalyst age, is responsible for the yields of benzene, since the datum points for benzene are widely scattered, and no curve can be drawn through them. This figure also illustrates that production of toluene over a platinum catalyst supported on alumina is a function of catalyst age, since a steady decline in yield is experienced, indicating again that with this catalyst, ammonia has a negligible, if any, effect on the yield of toluene.

The invention claimed is:

1. In a process for the production of benzene by the catalytic isomerization and dehydrogenation of methyl cyclopentane, the improvement which consists in contacting a saturated hydrocarbon fraction comprising methyl cyclopentane, in the presence of added hydrogen, and in the presence of a material selected from the group consisting of ammonia and amines, said material being present in an amount sufficient to yield from 3 to about 8.5 parts per million of ammonia based on the hydrocarbons, with a catalyst comprising platinum supported on a halogen-containing alumina, under reforming conditions of temperature and pressure, and recovering a reformate comprising benzene.

2. A process for the production of benzene which comprises contacting a feed stock consisting of a saturated hydrocarbon fraction comprising $C_6$ naphthenes together with from 3 to about 8.5 parts per million of ammonia, based on the hydrocarbon fraction, in the presence of added hydrogen, with a catalyst comprising platinum supported on a halogen-containing alumina, at a temperature of from about 875° F. to about 975° F. and at a pressure of from about 200 p.s.i.g. to about 600 p.s.i.g., and recovering a reformate comprising benzene.

References Cited in the file of this patent

UNITED STATES PATENTS

| | | |
|---|---|---|
| 2,752,289 | Haensel | Jan. 26, 1956 |
| 2,814,650 | Clark | Nov. 26, 1957 |
| 2,839,450 | Oettinger | June 17, 1958 |
| 2,849,377 | Ogburn et al. | Aug. 26, 1958 |
| 2,872,492 | Donaldson et al. | Feb. 3, 1959 |